United States Patent [19]

Akao et al.

[11] Patent Number: 4,796,517

[45] Date of Patent: Jan. 10, 1989

[54] METAL PISTON AND CERAMIC PISTON PIN ASSEMBLY

[75] Inventors: Shigeaki Akao; Mitsuyoshi Kawamura; Takio Kojima, all of Aichi, Japan

[73] Assignee: NGK Spark Plug Co., Ltd., Nagoya, Japan

[21] Appl. No.: 67,009

[22] Filed: Jun. 29, 1987

[30] Foreign Application Priority Data

Jul. 8, 1986 [JP] Japan .......................... 61-104495[U]
Jul. 8, 1986 [JP] Japan .......................... 61-104496[U]

[51] Int. Cl.$^4$ .............................................. F16J 1/14
[52] U.S. Cl. .................................... 92/187; 92/222; 123/193 P
[58] Field of Search ............... 92/212, 248, 187, 216, 92/222, 214, 176, 231; 123/193 P

[56] References Cited

U.S. PATENT DOCUMENTS

| | | | |
|---|---|---|---|
| 4,180,027 | 12/1925 | Taylor | 12/79 |
| 4,213,438 | 8/1980 | Elsbett | 123/193 P |
| 4,291,614 | 9/1981 | Molle et al. | 92/222 |
| 4,450,610 | 5/1984 | Schaper | 92/212 |
| 4,534,274 | 8/1985 | Ripberger et al. | 92/187 |
| 4,572,058 | 2/1986 | Hinz et al. | 92/216 |
| 4,696,224 | 9/1987 | Mishima | 92/222 |

FOREIGN PATENT DOCUMENTS

| | | | |
|---|---|---|---|
| 0049006 | 4/1982 | European Pat. Off. | 92/212 |
| 830587 | 2/1952 | Fed. Rep. of Germany. | |
| 3243882 | 6/1983 | Fed. Rep. of Germany. | |
| 3243939 | 5/1984 | Fed. Rep. of Germany. | |
| 0070038 | 4/1983 | Japan | 123/193 P |
| 352333 | 7/1931 | United Kingdom. | |

OTHER PUBLICATIONS

"Keramik und Faserverbundwerkstoffe in der Motorenentwicklung" (Ceramics and Fiber Composites in Engine Development); Motortechnische Zeitschrift 43 (1982), 10, p. 492.

Primary Examiner—Robert E. Garrett
Assistant Examiner—Thomas Denion
Attorney, Agent, or Firm—Foley & Lardner, Schwartz, Jeffery, Schwaab, Mack, Blumenthal & Evans

[57] ABSTRACT

A piston pin made of ceramics is journalled in piston bosses of a piston made of aluminum alloy. Intermediate members are installed in bearing bores to receive therein terminal end portions of the piston pin. The intermediate members are made of metal which is intermediate in thermal expansion coefficient between the aluminum alloy forming the piston and the ceramics forming the piston pin.

9 Claims, 3 Drawing Sheets

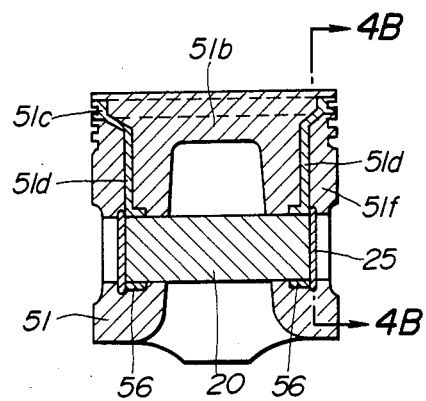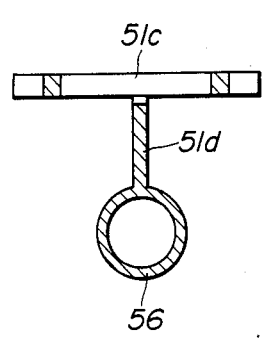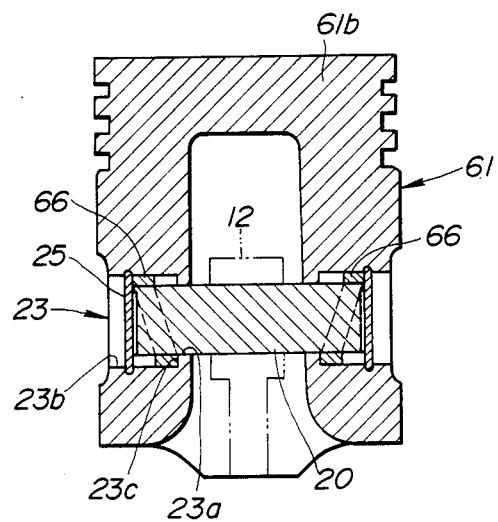

METAL PISTON AND CERAMIC PISTON PIN ASSEMBLY

BACKGROUND OF THE INVENTION

1. Field of the Invention

The present invention relates in general to internal combustion engines and more particularly to a metal piston and ceramic piston pin assembly for an internal combustion engine.

2. Description of the Prior Art

A prior art piston and piston pin assembly is exemplarily shown in FIGS. 6A-6D. Referring to the figures, a piston pin 10 for the connection between a piston 11 and a connecting rod 12 is journaled in piston bosses 11a and the small end of the connecting rod 12. The bearing surfaces or bores 13 of the piston bosses 11a are formed with snap ring grooves 14 for receiving therein snap rings 15 which are brought into contact with the opposite ends of the piston pin 10 for preventing endwise movement of the piston pin 10.

In recent years, studies have been in progress as to a piston pin which is made of ceramics such as silicon nitride, sialon, silicon carbide or the like in place of metal with a view to reducing the friction loss through weight reduction, improving the fuel consumption, etc. of the engine.

By the studies, the following new problem was revealed that was not caused in the case of a metal piston pin but in the case of a ceramic piston pin. During the combustion stroke, the heat of the combusted gases is first transferred to a piston head 11b from which it is transferred to a piston circumferential wall 11c and the piston bosses 11a toward the lower end of the piston 11 sequentially. In this situation, there occurs a temperature difference between the upper part and the lower part of the piston 11, causing a difference in thermal expansion therebetween and allowing the piston 11 to deform as shown in an exaggerated manner in FIG. 6B, i.e., in such a way that the diameter of the piston 11 is largest at the upper end and reduces gradually toward the lower end. Such irregular thermal expansion, however, does not cause spotty contact between the piston 10 and the bearing bores 13 where the piston pin 10 is made of metal since the metal piston pin 10 bends in accordance with thermal expansion of the piston 11. In contrast to this, where the piston pin 10 is made of ceramics, spotty contact occurs between the piston pin 10 and the bearing bores 13 since the piston pin 10 can bend little due to its high rigidity, and simultaneously the clearance between the piston pin 10 and the bearing bores 13 of the piston bosses 11a becomes too large due to the difference of thermal expansion therebetween, making thinner the film of oil therebetween and thus causing excessive wear of the bearing bores 13 at the particular portions 13a thereof located closer to the piston head 11b as shown in FIGS. 6C and 6D.

SUMMARY OF THE INVENTION

In accordance with the present invention, there is provided a novel and improved piston and piston pin assembly which comprises intermediate members interposed between axially opposed terminal ends of a piston pin and piston bosses of a piston. The piston pin is made of ceramics, while the piston is made of metal. The intermediate members are made of metal which is intermediate in thermal expansion coefficient between the metal forming the piston and the ceramics forming the piston pin.

In one embodiment, the intermediate members are made of alumina-silica reinforced aluminium alloy of fiber volume rate $Vf=10\%$ and of thermal expansion coefficient $\alpha = 14 \times 10^{-6} 1/°C$.

The metal forming the intermediate members is not limited to the above but may be a single metal, a composite metal having a porous base metal or a reinforced metal reinforced with at least one of alumina fiber, alumina-silica fiber, boron fiber, SiC-coated boron fiber and alumina whisker. In addition to the above, the metal forming the intermediate members is preferably high in hardness, i.e., harder than $H_RC$ 30 and made of niresist, high carbon high chromium steel for bearings, for instance.

The above structure is quite effective for overcoming the above noted disadvantages and shortcomings inherent in the prior art assembly.

It is accordingly an object of the present invention to provide a novel and improved piston and piston pin assembly which enables a ceramic piston pin to be practically used in combination with a piston made of aluminium alloy.

It is another object of the present invention to provide a novel and improved piston and piston pin assembly of the above described character which can prevent excessive wear of piston bosses when the piston made of aluminium alloy is used in combination with the ceramic piston pin.

It is a further object of the present invention to provide a novel and improved piston and piston pin assembly of the above described character which can improve the life of the piston. It is a yet further object of the present invention to provide a novel and improved piston and piston pin assembly which can reduce the friction loss through weight reduction of the associated engine and can improve the fuel consumption.

BRIEF DESCRIPTION OF THE DRAWINGS

FIG. 4A is a sectional view of a piston and a piston pin assembly according to a further embodiment of the present invention;

FIG. 4B is a sectional view taken along the line 4B—4B of FIG. 4A;

FIG. 5 is a sectional view of a piston and piston pin assembly according to a further embodiment of the present invention;

DESCRIPTION OF THE PREFERRED EMBODIMENTS

Figure 1:
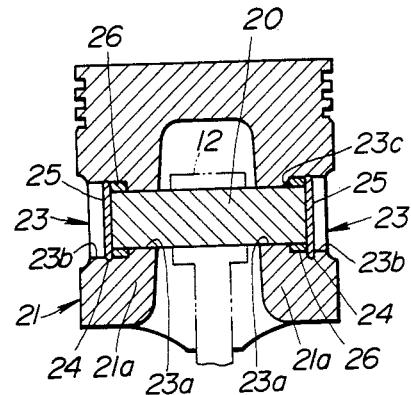
FIG. 1 is a sectional view of a piston and piston pin assembly according to an embodiment of the present invention.

Preferred embodiments of this invention will be described hereinafter with reference to drawings in which like reference characters designate like or corresponding parts.

Referring first to FIG. 1, a piston and piston pin assembly according to an embodiment of the present invention is shown as comprising a piston pin 20, piston 21 and annular intermediate members 26 interposed between the piston 21 and the piston pin 0 to receive axially opposed terminal ends of the piston pin 20.

The piston 21 is of the kind for use in a 2-liter 4-cylinder engine and made of aluminium alloy of thermal expansion coefficient $\alpha = 20 \times 10^{-6}$ 1/°C. The piston 21 has piston bosses 21a formed with bearing bores 23 of the length of 20 mm. The piston pin 20 is journalled in the bearing bores 23 of the piston bosses 21a and in a small end of a connecting rod 12 for the connection between the piston 21 and the connecting rod 12. The piston pin 20 is of the diameter of 18 mm and made of silicon nitride of thermal expansion coefficient $\alpha = 3.2 \times 10^{-6}$ 1/°C. Each bearing bore 23 consists of a smaller diameter bore portion 23a equal in diameter to the piston pin 20 and a larger diameter bore portion 23b of the diameter of 25 mm and located outwardly of the smaller diameter bore portion 23a. Each intermediate member 26 is installed in the larger diameter bore portion 23b by interference fit and made of alumina-silica silica fiber reinforced aluminium alloy of fiber volume rate $V_f = 10\%$ and of thermal expansion coefficient $\alpha = 14 \times 10^{-6}$ 1/°C. Each intermediate member 26 is of the inner diameter equal to the smaller diameter bore portion 23a and of the length 12 mm. After being installed in place, the intermediate members 26 are held in position together with the piston pin 20 by means of snap rings 25 installed in snap ring grooves 24 formed in the bearing bores 23. More specifically, each intermediate member 26 is held between each snap ring 25 and an annular shoulder 23c at the transition from the smaller diameter bore portion 23a to the larger diameter bore portion 23b.

Experiments were conducted with the engine in which the above described piston and piston pin assembly of this invention is installed. By the experiments, it was proved that no substantial wear was caused in the bearing bores after a 20-hour operation of the engine under a full throttle condition.

In the above, it is to be noted that the same effect is obtained when the intermediate members 26 are installed in the larger diameter bore portions 23b by transition fit.

Figure 2:
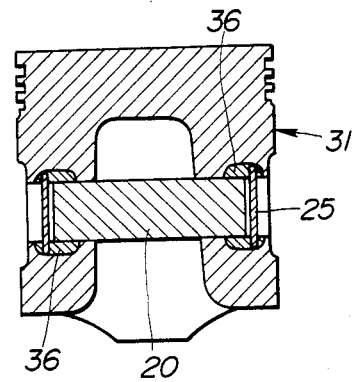
FIG. 2 is a sectional view of a piston and piston pin assembly according to another embodiment of the present invention.

Referring to FIG. 2, another embodiment is substantially similar to the previous embodiment of FIG. 1 except that the intermediate members 36 are made of alumina whisker reinforced aluminium alloy of fiber volume rate $V_f = 7\%$ and of thermal expansion coefficient $\alpha = 15 \times 10^{-6}$ 1/°C. The intermediate members 36 are cast in place at the time of casting of the piston 31.

Figure 3A:
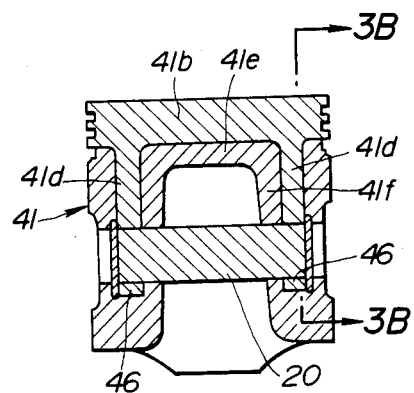
FIG. 3A is a sectional view of a piston and piston pin assembly according to a further embodiment of the present invention.
Figure 3B:
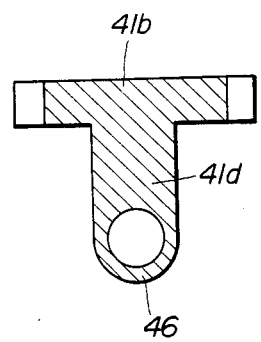
FIG. 3B is a sectional view taken along the line 3B—3B of FIG. 3A.
Figure 6A:
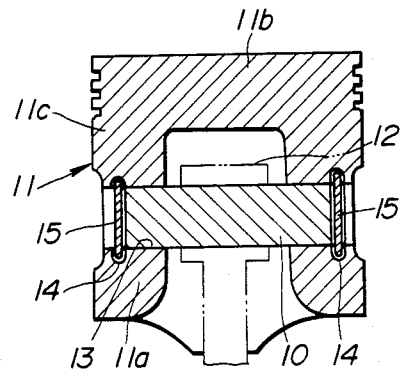
FIG. 6A is a sectional view of a prior art piston and piston pin assembly.
Figure 6B:
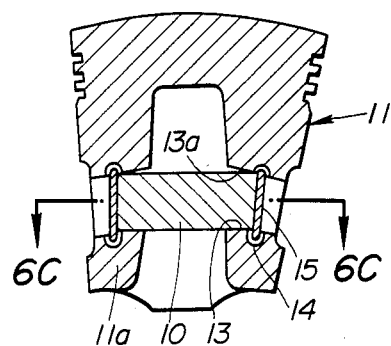
FIG. 6B is a sectional view of the prior art piston and piston pin assembly of FIG. 6A in its thermally expanded state.
Figure 6C:
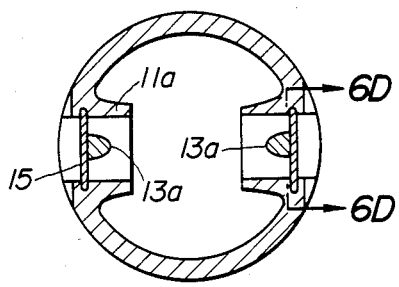
FIG. 6C is a sectional view taken along the line 6C—6C of FIG. 6B.
Figure 6D:
FIG. 6D is a sectional view taken along the line 6D—6D of FIG. 6C.

Referring to FIGS. 3A and 3B, a further embodiment is substantially similar to the previous embodiments of FIGS. 1 and 2 except that the intermediate members 46 are formed integral with the piston head 41b and made of alumina fiber reinforced aluminium alloy of fiber volume rate $V_f = 9\%$ and thermal expansion coefficient $\alpha = 14 \times 10^{-6}$ 1/°C. The intermediate members 46 are produced by being poured in a molten state into a die to be solidified therewithin under high pressure, i.e., by means of so-called molten metal forging.

More specifically, the piston 41 consists of two different material sections, a first section of which constitutes the piston head 41b and includes a pair of legs 41d depending from the piston head 41b in parallel with each other and a second section of which is generally cup-shaped to have a top wall 41e on which the piston head 41b lies and a circumferential wall 41f in which the legs 41d are embedded. The intermediate members 46 are formed integral with the lower end portions of the legs 41d.

Referring to FIGS. 4A and 4B, a further embodiment of the present invention is substantially similar to the previous embodiments of FIGS. 1 to 3A and 3B except that the intermediate members 56 are formed integral with a piston head circumferential wall portion 51c of the piston 51 and is made of niresist of Rockwell hardness $H_RC = 35$ and of thermal expansion coefficient $\alpha = 17 \times 10^{-6}$ 1/°C. The intermediate members 56 are produced by means of molten metal forging.

More specifically, the piston 51 consists of two different material sections, a first section of which includes a ring 51c constituting the above mentioned piston head circumferential wall portion and a pair of legs 51d depending from the ring 51c in parallel with each other and a second section of which is generally cup-shaped to have a top wall 51b around which the ring 51c is placed and a circumferential wall 51f in which the legs 51d are embedded. The intermediate members 56 are formed integral with the lower end portions of the legs 51d.

Referring to FIG. 5, a further embodiment of the present invention is substantially similar to the previous embodiments of FIGS. 1 to 4A and 4B except that the intermediate members 66 are made of SiC-coated boron fiber reinforced aluminium alloy of fiber volume rate $V_f = 8\%$ and thermal expansion Coefficient $\alpha = 14 \times 10^{-6}$ 1/°C. and that the intermediate members 66 are in the form of a particular ring that is obtained by cutting a cylindrical tube obliquely such that each intermediate member 66 is brought into contact with the shoulder 23c at a ring portion more remote from the piston head 61b and also into contact with an end of the piston pin 20 at another ring portion diametrically opposed to the above mentioned ring portion and located closer to the piston head 61b.

Experiments were also conducted with the engine in which the prior art piston and piston pin assembly is installed, under a condition corresponding to the embodiment of FIG. 1. By the experiments, it was found that the bearing bores 13 of the piston bosses 11a were worn off by the maximum amount of 30 μm in the places brought into spotty contact with the opposite ends of the piston pin 10 on the side closer to the piston head 11b.

In the foregoing, it will be understood that intermediate members are interposed between the terminal ends of the piston pin and the piston bosses, which intermediate members are intermediate in thermal expansion coefficient between the materials forming the piston and the piston pin. In this connection, it is to be noted that the metal forming the intermediate members is not limited to a single metal but may be a composite metal including a porous base metal or a reinforced metal reinforced with at least one of alumina fiber, alumina-silica fiber, boron fiber, SiC-coated boron fiber and alumina whisker. In addition to the above, the metal forming the intermediate members is preferably high in hardness, i.e., harder than $H_RC$ 30 and made of niresist, high carbon high chromium steel for bearings, for instance.

What is claimed is:

1. A piston and piston pin assembly comprising:
   a piston made of metal and having piston bosses;
   a connecting rod;
   a piston pin connected to the rod and made of ceramics, said pin being journalled in said piston bosses and having axially opposed terminal ends;
   retaining means for retaining said pins in said bosses;
   intermediate ring members in abutment with said retaining means and remote from said rod interposed between said terminal ends of said ceramic piston pin and said piston bosses, said intermediate members being made of metal which is intermediate in thermal expansion coefficient between the metal forming said piston and the ceramics forming said piston pin; and
   said piston having a piston head, said intermediate members being formed integral with said piston head.

2. A piston and piston pin assembly as set forth in claim 1 wherein said piston comprises two different material sections, a first section of which constitutes said piston head and includes a pair of legs depending from said piston head in parallel to each other and a second section of which is generally cup-shaped to have a top wall on which said piston head lies and a circumferential wall in which said legs are embedded, said intermediate members being formed integral with said legs.

3. A piston and piston pin assembly as set forth in claim 2 wherein said second section of said piston is made of aluminium alloy of thermal expansion coefficient $\alpha = 20 \times 10^{-6}$ 1/°C., said piston pin is made of silicon nitride of thermal expansion coefficient $\alpha = 3.2 \times 10^{-6}$ 1/°C., and said first section of said piston and said intermediate members are made of alumina fiber reinforced aluminium alloy of fiber volume rate $V_f = 9\%$ and of thermal expansion coefficient $= 14 \times 10^{-6}$ 1/°C.

4. A piston and piston pin assembly comprising:
   a piston made of metal and having piston bosses;
   a connecting rod;
   a piston pin connected to the rod and made of ceramics, said pin being journalled in said piston bosses and having axially opposed terminal ends;
   retaining means for retaining said pins in said bosses;
   intermediate ring members in abutment with said retaining means and remote from said rod interposed between said terminal ends of said ceramic piston pin and said piston bosses, said intermediate members being made of metal which is intermediate in thermal expansion coefficient between the metal forming said piston and the ceramics forming said piston pin; and
   said piston having a piston head circumferential wall portion, said intermediate members being formed integral with said piston head circumferential wall portion.

5. A piston and piston pin assembly as set forth in claim 4 wherein said piston comprises two different material sections, a first section of which includes a ring constituting said piston head circumferential wall portion and a pair of legs depending from said ring in parallel to each other and a second section of which is generally cup-shaped to have a top wall around which said ring is placed and a circumferential wall in which said legs are embedded, said intermediate members being formed integral with said legs.

6. A piston and piston pin assembly as set forth in claim 5 said second section of said piston is made of aluminium alloy of thermal expansion coefficient $\alpha = 20 \times 10^{-6}$ 1/°C., said piston pin is made of silicon nitride of thermal expansion coefficient $\alpha = 3.2 \times 10^{-6}$ 1/°C., and said first section of said piston and said intermediate members are made of niresist of thermal expansion coefficient $\alpha = 17 \times 10^{-6}$ 1/°C.

7. A piston and piston ring assembly as set forth in claim 1 or 4 wherein said metal forming said intermediate members is harder than $H_RC$ 30.

8. A piston and piston pin assembly comprising:
   a piston made of metal and having piston bosses;
   a connecting rod;
   a piston pin connected to the rod made of ceramics, said pin being journalled in said piston bosses and having axially opposed terminal ends;
   retaining means for retaining said pins in said bosses;
   ring-shaped intermediate members in abutment with said retaining means and remote from said rod made of metal and installed in said piston bosses receiving therein said terminal ends of said piston pin;
   said piston having different material sections, a first section made of the same metal as said intermediate members and formed integral therewith and a second section made of aluminum alloy;
   the metal forming said first section of said piston and said intermediate members being intermediate in thermal expansion coefficient between the aluminum alloy forming said second section of said piston and the ceramics forming said piston pin; and
   said first section of said piston including a circular head portion.

9. A piston and piston pin assembly of claim 1 wherein said ring members are oblique and include a portion in abutment with said retaining means and a portion remote from the retaining means and remote from the rod.

* * * * *